US005505672A

United States Patent [19]
Sakai et al.

[11] Patent Number: 5,505,672
[45] Date of Patent: Apr. 9, 1996

[54] CONTROL APPARATUS FOR HYDRAULICALLY OPERATED VEHICULAR TRANSMISSION

[75] Inventors: Takafumi Sakai; Hideki Wakamatsu; Yoshihiro Tsuboi; Hitoshi Kondo, all of Wako, Japan

[73] Assignee: Honda Giken Kogyo Kabushiki Kaisha, Tokyo, Japan

[21] Appl. No.: 285,136

[22] Filed: Aug. 3, 1994

[30] Foreign Application Priority Data

Sep. 1, 1993 [JP] Japan .................................. 5-217498

[51] Int. Cl.⁶ ............................................. F16H 61/06
[52] U.S. Cl. ................................................. 477/117
[58] Field of Search ............................. 477/98, 117

[56] References Cited

U.S. PATENT DOCUMENTS

| | | | |
|---|---|---|---|
| 4,982,622 | 1/1991 | Yamamoto et al. | 477/117 |
| 5,005,444 | 4/1991 | Kimura et al. | |
| 5,090,270 | 2/1992 | Suzuki | |
| 5,107,723 | 4/1992 | Yamashita et al. | 477/117 |

FOREIGN PATENT DOCUMENTS 0149012  7/1985  European Pat. Off. .
1-303349 12/1989  Japan .

*Primary Examiner*—Dirk Wright
*Attorney, Agent, or Firm*—Armstrong, Westerman, Hattori, McLeland & Naughton

[57] ABSTRACT

In a control apparatus for a hydraulically operated vehicular transmission which has a plurality of hydraulic engaging elements, an orifice is disposed in an oil passage which is communicated with a hydraulic engaging element for a low-speed transmission train. The control apparatus has a bypass passage which bypasses the orifice, a control valve which can be switched between a communicated state in which the bypass passage is in communication and a cut-off state in which the communication of the bypass passage is cut off, and a control circuit which changes over the control valve to the communicated state under a predetermined condition at a time of switching from a running range to a neutral range.

9 Claims, 4 Drawing Sheets

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically operated vehicular transmission which has a plurality of hydraulic engaging elements such as clutches and brakes.

2. Description of Related Art

A well-known version of this control apparatus is described in Japanese Published Unexamined Patent Application No. 303349/1989. Namely, in an oil passage which leads to a hydraulic engaging element for a low-speed transmission train, there is disposed an orifice as well as a check valve for oil discharging which is in parallel with the orifice. There is also provided a bypass passage Which bypasses the orifice and in this bypass passage there is interposed a gate valve to open and close it. At the time of changing over from a neutral range to a running range (i.e., at an in-gear time or at the time of gear engagement), the gate valve is opened under a predetermined condition.

In the above-described prior art, its object lies in alleviating the in-gear shocks (i.e., shocks at the time of gear engagement) by adjusting the speed of hydraulic oil supply to the hydraulic engaging element for the low-speed transmission train at the time of gear engagement. It does not however take into consideration at all the off-gear shocks (i.e., shocks at the time of gear disengagement) which occur at the time of switching from the running range to the neutral range (i.e., at the time of gear disengagement).

Off-gear shocks are the shocks that occur in the following manner. Namely, when the vehicle is stopped in the running range, the driving unit made up of an engine and a transmission is displaced in position while elastically deforming engine mounting elements by the driving reaction forces due to the power transmission via the low-speed transmission train and then, at the time of changing over to the neutral range, the driving unit returns from the displaced state to the normal position, at which time the off-gear shocks occur. In the above-described prior art, the off-gear shocks occur on the following occasion. Namely, at the time of gear disengagement, the hydraulic oil pressure in the hydraulic engaging element for the low-speed transmission train rapidly drops by oil discharge via the check valve that is in parallel with the orifice. By the rapid disengagement of the low-speed transmission train, the driving unit suddenly returns to the normal position, giving rise to the occurrence of the off-gear shocks.

Here, if the hydraulic oil pressure in the hydraulic engaging element for the low-speed transmission train is slowly decreased by means of the orifice that is disposed in the oil passage thereof, the off-gear shocks may be alleviated. However, in case the viscosity of the oil is high at a low temperature, the disengagement of the hydraulic engaging element for the low-speed transmission train will be delayed too much. There will consequently occur a dragging of the hydraulic engaging element, accompanied by the deterioration in durability. In addition, at the time of gear disengagement when the accelerator pedal is depressed or when the vehicle is running, there will also occur deterioration in durability caused by dragging unless the hydraulic engaging element for the low-speed transmission train is disengaged quickly.

In view of the above points, the present invention has an object of providing a control apparatus in which the off-gear shocks are alleviated and in which the impairing of the durability due to the dragging of the hydraulic engaging element for the low-speed transmission train can be prevented.

SUMMARY OF THE INVENTION

In order to attain the above-described and other objects, the present invention is a control apparatus for a hydraulically operated vehicular transmission having a plurality of hydraulic engaging elements, the control apparatus having flow restricting means disposed in an oil passage which is communicated with a hydraulic engaging element for a low-speed transmission train. The control apparatus comprises a bypass passage which bypasses the flow restricting means, a control valve which can be switched between a communicated state in which the bypass passage is in communication and a cut-off state in which the communication of said bypass passage is cut off, and control means which switches the control valve to the communicated state under a predetermined condition at a time of switching from a running range to a neutral range.

At the time of switching from the running range to the neutral range (i.e., at the time of gear disengagement), the oil discharge from the hydraulic engaging element for the low-speed transmission train is restricted by the flow restricting means if the control valve is in the cut-off state. If the control valve is in the communicated state, the oil is discharged via the bypass passage without being subjected to the restriction by the flow restricting means.

At the time of ordinary gear disengagement, the control valve is made to be in the cut-off state to slowly decrease the hydraulic oil pressure in the hydraulic engaging element for the low-speed transmission train, thereby alleviating the off-gear shocks.

On the other hand, under a predetermined condition in which the dragging due to a delay in disengagement of the hydraulic engaging element for the low-speed transmission train becomes the problem, e.g., when the viscosity of the oil is high in a cold state of the transmission, or when the engine output torque is above a predetermined level, or when the vehicle speed is above a predetermined value, the control valve is made to be in the communicated state at the time of gear disengagement to thereby quickly discharge the hydraulic engaging element for the low-speed transmission train.

At the time of ordinary gear disengagement under no predetermined condition, if the oil discharge remains restricted even after the alleviating function has been effected by the slow decrease in the hydraulic oil pressure in the hydraulic engaging element for the low-speed transmission train, there will occur the dragging of the hydraulic engaging element for the low-speed transmission train. Therefore, it is preferable to stop the control based on the result of discrimination of the above-described predetermined condition at a predetermined period after the gear disengagement, e.g., at a lapse of a predetermined time from the point of time of the gear disengagement, and to change over the control valve to the communicated state, thereby quickly disengaging the hydraulic engaging element for the low-speed transmission train.

Further, though a control valve exclusively for use by the bypass passage may be provided, if the control valve is constituted by a shift valve which effects establishment and release of the low-speed transmission train, it is advantageous because the construction of the apparatus can be simplified.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
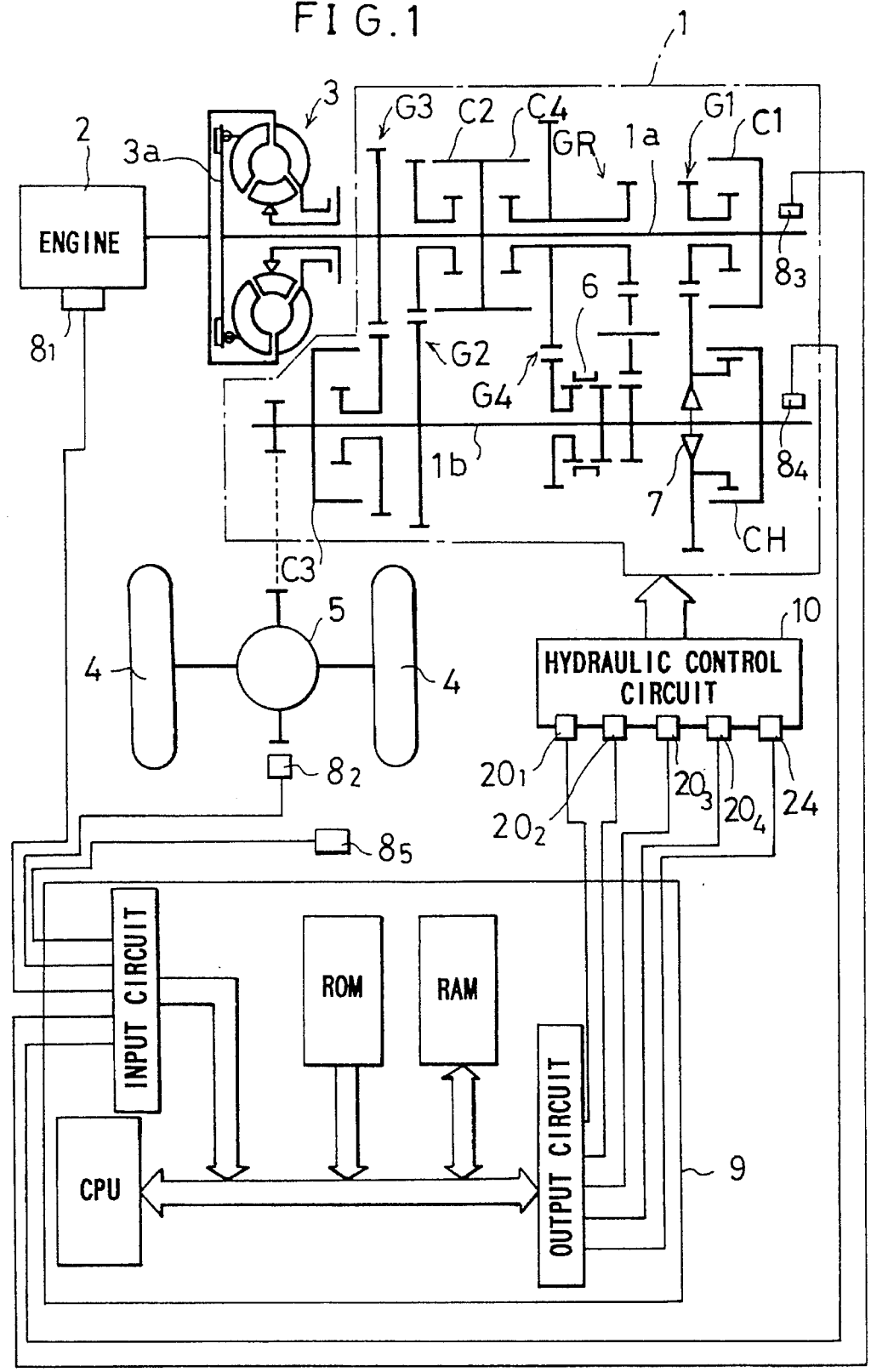
FIG. 1 is a system diagram showing a transmission in which the present invention is applied and the control system thereof.

Referring to FIG. 1, numeral 1 denotes a transmission for effecting speed changing or shifting of four forward transmission trains and one reverse transmission train. Between an input shaft 1a which is connected to an engine 2 via a fluid torque converter 3 having a clutch 3a and an output shaft 1b which is connected via a differential gear 5 to driven wheels 4 of a vehicle, there are provided first-speed through fourth-speed forward transmission trains G1, G2, G3, G4 and one reverse transmission train GR all on parallel. In the forward transmission trains there are interposed hydraulic engaging elements in the form of hydraulic clutches C1, C2, C3, C4, respectively, to selectively establish each of the forward transmission trains through engagement of each of the hydraulic clutches. The reverse transmission train GR is arranged to share the use of the fourth-speed hydraulic clutch C4 with the fourth-speed transmission train G4. The fourth-speed transmission train G4 and the reverse transmission train GR are thus selectively established by the action of a selector gear 6 which is provided on the output shaft 1b to the forward running position on the left-hand side in the drawing and to the reverse running position on the right-hand side therein.

In the first-speed transmission train G1 there is interposed a one-way clutch 7 which allows for overrunning of the output side. It is thus so arranged that, even in a condition in which the first-speed hydraulic clutch C1 is kept engaged, each of the transmission trains G2, G3, G4 of the second speed through the fourth speed can be established by engaging the second-speed through the fourth-speed hydraulic clutches C2, C3, C4. Further, there is provided a first-speed holding clutch CH which bypasses the one-way clutch 7. It is thus so arranged that the first-speed transmission train G1 can be established in a condition in which, by the engagement of the hydraulic clutch CH, the overrunning of the output side is not allowed, i.e., a condition in which the engine braking can be applied.

There are provided an electronic control circuit 9 and a hydraulic control circuit 10 for the above-described plurality of hydraulic clutches. The electronic control circuit 9 is made up of a microcomputer to which there are inputted signals from an engine sensor $8_1$ for detecting a throttle opening, a revolution speed, a cooling liquid temperature of the engine 2, a vehicle speed sensor $8_2$ for detecting the speed of the vehicle based on the revolution speed of the differential gear 5, rotation sensors $8_3$, $8_4$ for detecting the revolution speeds of the input shaft 1a and the output shaft 1b, respectively, of the transmission 1, and a position sensor $8_5$ for the manual valve which is to be described hereinafter. Speed changing is thus made by controlling a plurality of solenoid valves, which are described hereinafter, of the hydraulic control circuit 10 by the electronic control circuit 9.

Figure 2:
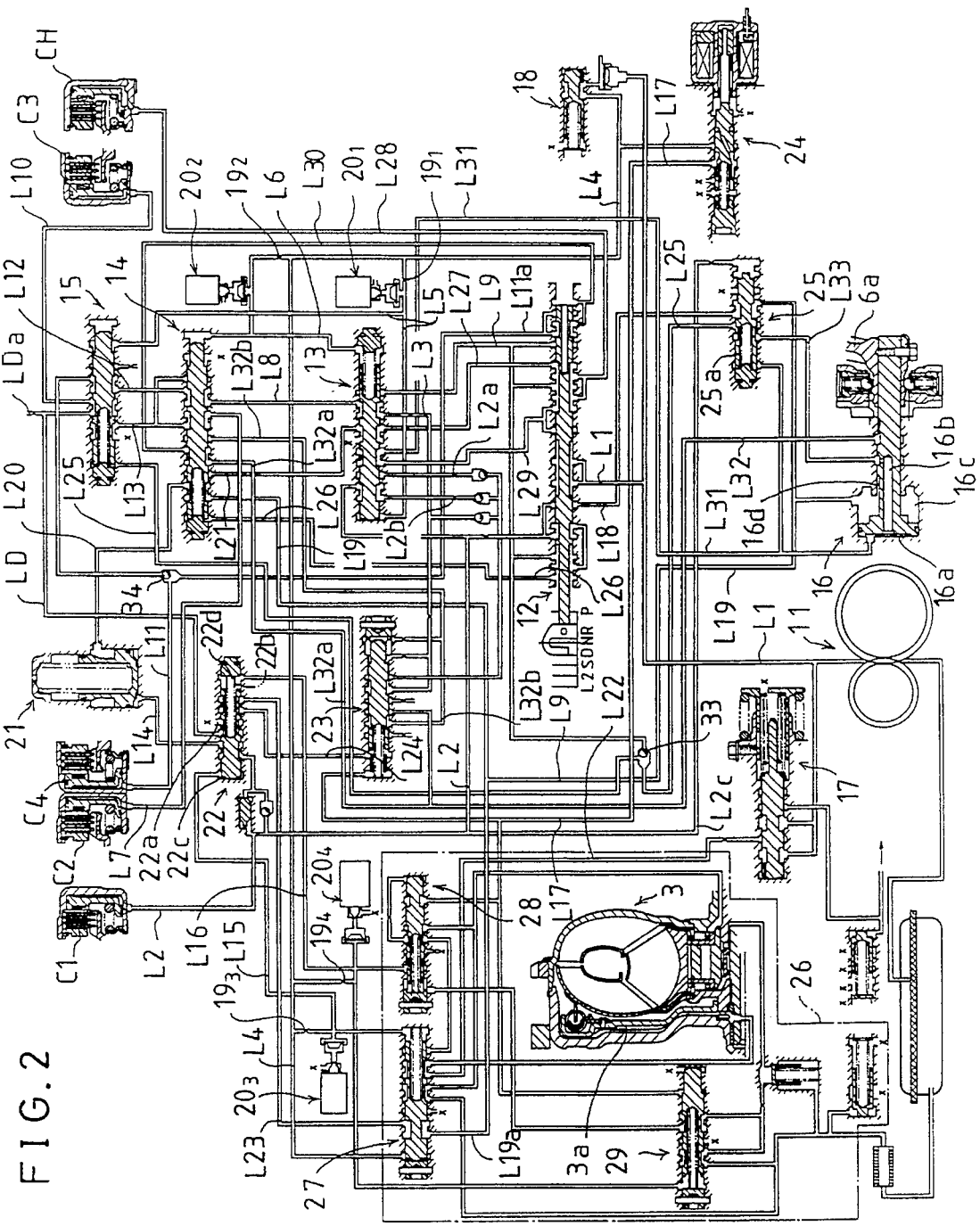
FIG 2. is a circuit diagram showing a hydraulic control circuit thereof.
Figure 3:
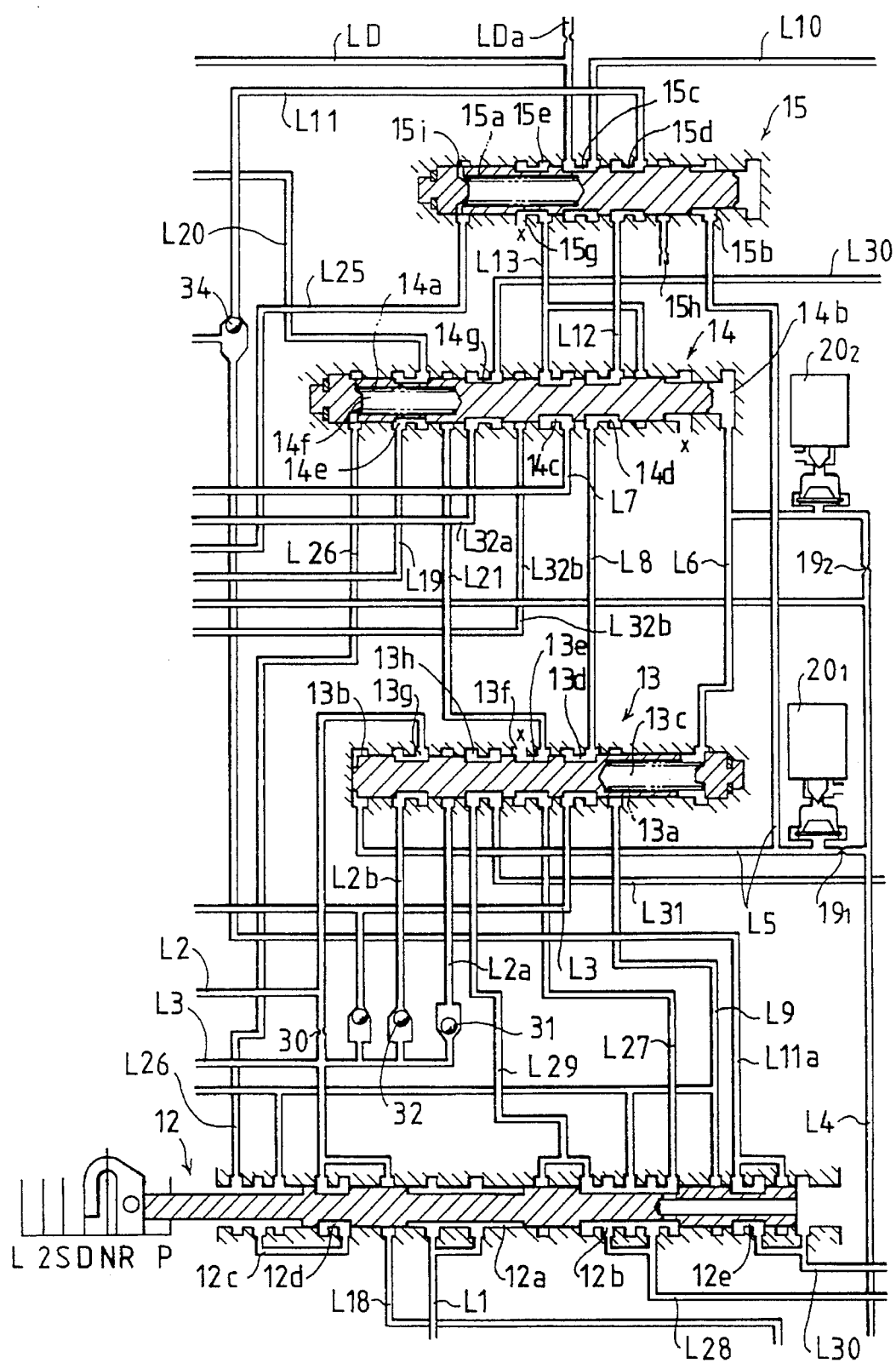
FIG. 3 is an enlarged view of a manual valve and shift valves in the circuit of FIG. 2.

The hydraulic control circuit 10 is provided, as shown in FIGS. 2 and 3, with a hydraulic oil pressure source 11, a manual valve 12 which can be switched to seven positions of "P" for parking, "R" for reverse running, "N" for neutral, "D" and "S" for automatic speed changing, "2" for holding the second speed and "L" for holding the first speed, three sets of No. 1 through No. 3 shift valves 13, 14, 15, and a servo valve 16 to which is connected a shift fork 6a of the selector gear 6 for switching between forward running and reverse running.

In the "D" position of the manual valve 12, No. 1 oil passage L1 which is communicated with the hydraulic oil pressure source 11 is connected, via an annular groove 12a of the manual valve 12, to No. 2 oil passage L2 which is communicated with the first-speed hydraulic clutch C1. Pressurized hydraulic oil which is adjusted by a regulator valve 17 to a constant line pressure is always supplied from No. 1 oil passage L1 to the first-speed hydraulic clutch C1 via No. 2 oil passage L2. Further, the hydraulic oil is selectively supplied to the second-speed through the fourth-speed hydraulic clutches C2, C3, C4 via No. 3 oil passage L3 which is branched from No. 2 oil passage L2 and via the above-described shift valves 13, 14, 15.

Here, No. 1 shift valve 13 is urged to the left-hand side by a spring 13a and No. 2 shift valve 14 and No. 3 shift valve 15 are urged to the right-hand side by a spring 14a, 15a, respectively. A modulator pressure (a constant pressure which is lower than the line pressure) from a modulator valve 18 which is connected to No. 1 oil passage L1 is inputted, via No. 5 oil passage L5 that is communicated via an orifice $19_1$ with No. 4 oil passage L4 on the output side of the modulator valve 18, to a left end oil chamber 13b of No. 1 shift valve 13 and to a right-hand side oil chamber 15b of No. 3 shift valve 15, respectively. The modulator pressure is also inputted, via No. 6 oil passage L6 which is communicated via an orifice $19_2$ with No. 4 oil passage L4, to a right end oil chamber 13c of No. 1 shift valve 13 and to a right end oil chamber 14b of No. 4 shift valve 14, respectively. There are further provided in No. 5 oil passage L5 a normally-closed type No. 1 solenoid valve $20_1$ which opens No. 5 oil passage L5 to atmosphere and in No. 6 oil passage L6 a normally-closed type No. 2 solenoid valve $20_2$ which opens No. 6 oil passage L6 to atmosphere. By the opening and closing of these two solenoid valves $20_1$, $20_2$, these shift valves 13, 14, 15 are switched in the following manner in accordance with each of the transmission trains.

Namely, at the first speed, No. 1 solenoid valve $20_1$ is closed and No. 2 solenoid valve $20_2$ is opened. According to this operation, the modulator pressure is inputted to the left end oil chamber 13b of No. 1 shift valve 13 and to the right-hand side oil chamber 15b of No. 3 shift valve 15 respectively, and the right end oil chamber 13c of No. 1 shift valve 13 and the right end oil chamber 14b of No. 2 shift valve 14 are opened to atmosphere. No. 1 shift valve 13 and No. 2 shift valve 14 are thus switched to right-hand side position and No. 3 shift valve 15 is switched to the left-hand side position. In this condition, No. 7 oil passage L7 which is communicated with No. 2 hydraulic clutch C2 is connected, via an annular groove 14c of No. 2 shift valve 14, to No. 8 oil passage L8 which leads to No. 1 shift valve 13, and No. 8 oil passage L8 is connected, via an annular groove 13d of No. 1 shift valve 13, to No. 9 oil passage L9 that is connected to an open-to-atmosphere groove 12b of the manual valve 12 in the "D" position thereof, thereby discharging the hydraulic oil from the second-speed hydraulic clutch C2. No. 10 oil passage L10 which is communicated with the third-speed hydraulic clutch C3 is connected, via an annular groove 15c of No. 3 shift valve 15, to an oil discharge passage LD, thereby discharging the hydraulic oil from the third-speed hydraulic clutch C3. No. 11 oil passage L11 which is communicated with the fourth-speed hydraulic clutch C4 is connected, via an annular groove 15d of No. 3 shift valve 15, to No. 12 oil passage L12 which leads to No. 2 shift valve 14, and No. 12 oil passage L12 is connected, via an annular groove 14d of No. 2 shift valve 14, to No. 13 oil passage L13 which leads to No. 3 shift valve 15. No. 13 oil passage L13 is connected, via an annular groove 15e of No. 3 shift valve 15, to an oil discharge port 15g thereof, thereby discharging the hydraulic oil from the fourth-speed hydraulic clutch C4. Therefore, it is only the first-speed hydraulic clutch C1 that is supplied with the hydraulic oil, thereby establishing the first-speed transmission train G1.

At the second speed, both No. 1 solenoid valve $20_1$ and No. 2 solenoid valve $20_2$ are opened. According to this operation, No. 1 shift valve 13 is switched to the left-hand side position and No. 2 shift valve 14 and No. 3 shift valve 15 are switched to the right-hand side position. In this condition, No. 3 oil passage L3 is connected to No. 8 oil passage L8 via the annular groove 13d of No. 1 shift valve 13, and No. 8 oil passage L8 is connected to No. 7 oil passage L7 via the annular groove 14c of No. 2 shift valve 14, thereby supplying the hydraulic oil to the second-speed hydraulic clutch C2. On the other hand, No. 10 oil passage L10 which is communicated with the third-speed hydraulic clutch C3 is connected to the oil discharge passage LD via the route of the annular groove 15c of No. 3 shift valve 15, No. 12 oil passage L12, the annular groove 14d of No. 2 shift valve 14, No. 13 oil passage L13 and the annular groove 15e of No. 3 shift valve 15, thereby discharging the hydraulic oil from the third-speed hydraulic clutch C3. Further, No. 11 oil passage L11 which is communicated with the fourth-speed hydraulic clutch C4 is connected, via the annular groove 15d of No. 3 shift valve 15, to an oil discharge port 15h of No. 3 shift valve 15, thereby discharging the hydraulic oil from the fourth-speed hydraulic clutch C4. The second-speed transmission train G2 is therefore established.

At the third speed, No. 1 solenoid valve $20_1$ is opened and No. 2 solenoid valve $20_2$ is closed. According to this operation, No. 1 shift valve 13 is kept in the left-hand side position, No. 3 shift valve 15 is kept in the right-hand side position and No. 2 shift valve 14 is changed over to the left-hand side position by the input of the modulator pressure to the right end oil chamber 14b of No. 2 shift valve 14. In this condition, like at the second speed, No. 8 oil passage L8 which is connected to No. 3 oil passage L3 via the annular groove 13d of No. 1 shift valve 13 is connected to No. 12 oil passage L12 via the annular groove 14d of No. 2 shift valve 14. Here, like at the second speed, since No. 12 oil passage L12 is connected to No. 10 oil passage L10 via the annular groove 15c of No. 3 shift valve 15, the hydraulic oil is supplied to the third-speed hydraulic clutch C3. On the other hand, No. 7 oil passage L7 which is communicated with the second-speed hydraulic clutch C2 is connected to the oil discharge passage LD via the route of the annular groove 14c of No. 2 shift valve 14, No. 13 oil passage L13 and the annular groove 15e of No. 3 shift valve 15, thereby discharging the hydraulic oil from the second-speed hydraulic clutch C2. Further, No. 11 oil passage L11 which is communicated with the fourth-speed hydraulic clutch C4 is connected, like at the second speed, to the oil discharge port L15h of No. 3 shift valve 15 via the annular groove 15d of No. 3 shift valve 15, thereby discharging the hydraulic oil from the fourth-speed hydraulic clutch C4. The third-speed transmission train G3 is therefore established.

At the fourth speed, No. 1 solenoid valve $20_1$ and No. 2 solenoid valve $20_2$ are both closed. According to this operation, the modulator pressure is inputted to the left end oil chamber 13b of No. 1 shift valve 13, but this rightward urging force is balanced with the modulator pressure to be inputted to the right end oil chamber 13c of No. 1 shift valve 13, with the result that No. 1 shift valve 13 is held in the left-hand side position of No. 1 shift valve 13 due to the force of the spring 13a. No. 2 shift valve 14 is also held in the left-hand side position like at the third speed but, on the other hand, No. 3 shift valve 15 is changed over to the left-hand side position by the input of the modulator pressure to the right-hand side oil chamber 15b of No. 3 shift valve 15. In this condition, No. 12 oil passage L12 which is communicated with No. 3 oil passage L3 via No. 8 oil passage L8 is connected to No. 11 oil passage L11 via the annular groove 15d of No. 3 shift valve 15, thereby supplying the hydraulic oil to the fourth-speed hydraulic clutch C4. On the other hand, No. 10 oil passage L10 which is communicated with the third-speed hydraulic clutch C3 is connected to the oil discharge passage LD via the annular groove 15c of No. 3 shift valve 15, thereby discharging the hydraulic oil from the third-speed hydraulic clutch C3. Furthermore, No. 13 oil passage L13 which is connected, via the annular oil groove 14c of No. 2 shift valve 14, to No. 7 oil passage L7 which is communicated with the second-speed hydraulic clutch C2, like at the third speed, is connected to the oil discharge port 15g of No. 3 shift valve 15, thereby discharging the hydraulic oil from the second-speed hydraulic clutch C2. The fourth-speed transmission train G4 is therefore established.

The opening and closing of No. 1 solenoid valve $20_1$ and No. 2 solenoid valve $20_2$ and the changeover positions of No. 1 through No. 3 shift valves 13, 14, 15 can be summarized as shown in Table 1. In the "D" position of the manual valve 12, No. 1 solenoid valve $20_1$ and No. 2 solenoid valve $20_2$ are controlled for opening or closing by the electronic control circuit 9 according to the speed-change characteristics to be set based on the speed of the vehicle and throttle opening, thereby effecting the automatic speed changing of the first speed through the fourth speed.

|  | No. 1 solenoid valve | No. 2 solenoid valve | No. 1 shift valve | No. 2 shift valve | No. 3 shift valve |
| --- | --- | --- | --- | --- | --- |
| First speed | closed | open | right | right | left |
| Second speed | open | open | left | right | right |
| Third speed | open | closed | left | left | right |
| Fourth speed | closed | closed | left | left | left |

By the way, to No. 2 oil passage L2 which is communicated with the first-speed hydraulic clutch C1, there is connected an accumulator 21 via No. 14 oil passage L14 which is branched from No. 2 oil passage L2. In this No. 14 oil passage L14 there is disposed a control valve 22. This control valve 22 can be changed over between the left-hand side position in which the upstream portion and the downstream portion of No. 14 oil passage L14 are brought into communication with each other and the right-hand side position in which the above-described communication is cut off. There is provided in this control valve 22 a port that is communicated with the above-described oil discharge passage LD. In the right-hand side position of the control valve 22, the downstream portion of No. 14 oil passage L14 that is communicated with the accumulator 21 is arranged to be connected to the oil discharge passage LD. In the left-hand side position of the control valve 22, the oil discharge passage LD is arranged to be connected to an oil discharge port 22a of the control valve 22.

The control valve 22 is urged to the left by a spring 22b and is further provided with a left end oil chamber 22c and a right end oil chamber 22d. The left end oil chamber 22c is arranged to receive an input of the modulator pressure from the modulator valve 18 via No. 15 oil passage L15 which is connected to No. 4 oil passage L4 via an orifice $19_3$. The right end oil chamber 22d is arranged to receive an input of the modulator pressure via No. 16 oil passage L16 which is communicated with No. 4 oil passage L4 via an orifice $19_4$. In No. 15 oil passage L15 there is disposed a normally-closed type No. 3 solenoid valve $20_3$ which opens No. 15 oil passage L15 to atmosphere. In No. 16 oil passage L16 there is disposed a normally-closed type No. 4 solenoid valve $20_4$ which opens No. 16 oil passage L16 to atmosphere. When No. 3 solenoid valve $20_3$ is closed, the control valve 22 is changed over to the right-hand side position by the input of the modulator pressure to the left end oil chamber 22c. When No. 4 solenoid valve $20_4$ is closed even when No. 3 solenoid valve $20_3$ is kept closed, the modulator pressure is inputted to the right end oil chamber 22d, with the result that the urging forces by the modulator pressure on the right and the left oil chambers 22c, 22d are well balanced and, consequently, the control valve 22 is switched to the left-hand side position by the force of the spring 22b.

Here, the discharging of the hydraulic oil at the time of the speed changing via the oil discharge passage LD from a hydraulic clutch to be disengaged takes place at the time of upshifting from the second speed to the third speed, upshifting from the third speed to the fourth speed, downshifting from the third speed to the second speed, and downshifting from the third speed to the first speed. At the time of this speed changing, except at the time of downshifting from the third speed to the first speed while including the one-way clutch 7, the control valve 22 is switched to the right-hand side position up to a predetermined time point (or timing) of the transient period of the speed changing to connect the accumulator 21 to the oil discharge passage LD. The accumulated hydraulic oil in the accumulator 21 is thus supplied to the oil discharge passage LD to buffer the decrease or drop in the pressure of the hydraulic clutch to be disengaged. Thereafter, the control valve 22 is switched to the left-hand side position to connect the oil discharge passage LD to the oil discharge port 22a. The hydraulic oil from the hydraulic clutch to be disengaged is thus made to be discharged also from the oil discharge port 22a, in addition to an oil discharge port LDa with an orifice of the oil discharge passage LD. The pressure decrease or drop characteristics of the hydraulic clutch to be disengaged is thus made to be accompanied with slowness or rapidity so that an appropriate simultaneous engagement thereof with the hydraulic clutch to be engaged can be obtained.

By the way, the hydraulic oil pressure to a hydraulic clutch to be engaged is adjustable by a pressure adjusting valve 23 which is interposed in No. 3 oil passage L3. There is inputted to this pressure adjusting valve 23, via No. 17 oil passage L17, an output hydraulic oil pressure from a hydraulic oil pressure control valve 24 which is made up of a linear solenoid valve to be controlled by the electronic control circuit 9. The pressure increase characteristics in the hydraulic clutch to be engaged are controlled by the hydraulic oil pressure control valve 24 via the pressure adjusting valve 23.

In the "D" position of the manual valve 12, No. 18 oil passage L18 is connected to No. 1 oil passage L1 via the annular groove 12a of the manual valve 12. No. 19 oil passage L19 which is connected via a servo valve 25, which is to be described hereinafter, to No. 18 oil passage L18 is connected to No. 20 oil passage L20 which is communicated with a back pressure chamber of the accumulator 21 via an annular groove 14e of No. 2 shift valve 14 that is in the left-hand side position at the time of the third speed and the fourth speed. The internal pressure in the accumulator 21 thus becomes equal to the line pressure. On the other hand, at the second speed, by the changeover of No. 2 shift valve 14 to the right-hand side position, No. 20 oil passage L20 is connected, via the annular groove 14e of No. 2 shift valve 14, to No. 21 oil passage L21 which leads to No. 1 shift valve 13. No. 21 oil passage L21 is connected to an oil discharge port 13f of No. 1 shift valve 13 via an annular groove 13e of No. 1 shift valve 13 that is in the left-hand side position. The internal pressure of the back pressure chamber of the accumulator 21 therefore becomes equal to the atmospheric pressure.

In this manner, the pressure decrease in the second-speed hydraulic clutch C2 to be disengaged which is connected to the oil discharge passage LD at the time of upshifting from the second speed to the third speed, and the pressure decrease in the third-speed hydraulic clutch C3 to be disengaged which is connected to the oil discharge passage LD at the time of upshifting from the third speed to the fourth speed are buffered in a relatively high hydraulic oil pressure range because the back pressure in the accumulator 21 is high. As a result of the pressure increase in the hydraulic clutch to be engaged, there occurs a condition in which the hydraulic clutch to be engaged and the hydraulic clutch to be disengaged are simultaneously engaged.

At the time of downshifting from the third speed to the second speed, since the back pressure in the accumulator 21 becomes low, the pressure decrease in the third-speed hydraulic clutch C3 to be disengaged is buffered in a relatively low hydraulic oil pressure range. Therefore, the engine races to an appropriate degree and smooth speed changing is effected. At a lapse of a predetermined time from the outputting of an order for speed changing, the control valve 22 is switched to the left-hand side position.

The order to switch the control valve 22 to the right-hand side position is made by outputting order signals to close No. 3 solenoid valve $20_3$ and to open No. 4 solenoid valve $20_4$. Here, No. 3 solenoid valve $20_3$ also serves the function of a solenoid valve to switch a shift valve 27 which is provided in a conventional clutch control circuit 26, the shift valve 27 being for controlling the clutch 3a for the fluid torque converter 3 by using, as the working fluid, the hydraulic oil to be supplied from the regulator valve 17 via No. 22 oil passage L22. When No. 3 solenoid valve $20_3$ is closed, the shift valve 27 is switched to the leftward position in which the clutch 3a is disengaged. Therefore, at the time of the above-described speed changing in which the control valve 22 is switched to the right-hand side position, the clutch 3a is disengaged and, due to the slippage in the fluid torque converter 3, the occurrence of shocks at the time of speed changing is more effectively restrained or kept under control. No. 4 solenoid valve $20_4$ also serves the function of a solenoid valve which controls a control valve 28 and a timing valve 29 which are provided in the clutch control circuit 26 to adjust the engaging force of the clutch 3a.

In the position of the shift valve 27 in which the clutch 3a is disengaged, a branch oil passage L19a of No. 19 oil passage L19 is connected to No. 23 oil passage L23 which leads to the control valve 22. By switching the control valve 22 to the left-hand side position, the line pressure is inputted from No. 23 oil passage L23 to the pressure adjusting valve 23 via No. 24 oil passage L24. The output hydraulic oil pressure of the pressure adjusting valve 23, i.e., the hydraulic oil pressure of the hydraulic clutch to be engaged is thus boosted depending on the decrease in the hydraulic oil pressure in the hydraulic clutch to be disengaged.

In order to decrease or alleviate the in-gear shocks, i.e., shocks at the time of gear engagement, when the gear is engaged to start the vehicle by changing over the manual valve 12 from the "P" or "N" position to the "D" position, a squat control is made in which the second-speed transmission train G2 is established first by changing over No. 1 shift valve 13 to the left-hand side position and No. 2 shift valve 14 to the right-hand side position and then the first-speed transmission train G1 is established by changing over No. 1 shift valve 13 to the right-hand side position. At this time, it is necessary to prevent the hydraulic oil pressure in the first-speed hydraulic clutch C1 from rising faster than the hydraulic oil pressure in the second-speed hydraulic clutch C2. For that purpose, No. 2 oil passage L2 is provided with a small-diameter orifice 30 which is located on a downstream side of the branched portion of No. 3 oil passage L3. Furthermore, No. 2 oil passage L2 is provided with a pair of bypass passages L2a, L2b which bypass the orifice 30. There is interposed in one of them, i.e., in No. 1 bypass passage L2a, a check valve 31 which allows for the oil supply from the upstream side to the downstream side and, in the other of them, i.e., in No. 2 bypass passage L2b, a check valve 32 which allows for the oil supply from the downstream side to the upstream side. Further, by the switching action of No. 1 shift valve 13 both bypass passages L2a, L2b are arranged to be selectively communicated via an annular groove 13g of No. 1 shift valve 13. Until No. 1 shift valve 13 is switched, by the squat control, from the left-hand side position to the right-hand side position to thereby shift down from the second speed to the first speed, the hydraulic oil is slowly supplied to No. 1 hydraulic clutch C1 only via the orifice 30. When the downshifting has been effected, No. 1 bypass passage L2a is opened to communication and, by the hydraulic oil supply via the bypass passage L2a, No. 1 hydraulic clutch C1 is arranged to quickly rise in the hydraulic oil pressure.

Since the back pressure in the accumulator 21 at the second speed is in a low pressure as described above, the boosting of the hydraulic pressure in the first-speed hydraulic clutch C1 is buffered in a relatively low hydraulic oil pressure range. Therefore, the setting up or rise in the hydraulic oil pressure in the first-speed hydraulic clutch C1 at the time of establishing the second speed by the squat control is more effectively restrained. At the first speed, No. 21 oil passage L21 which is connected, via the annular groove 14e of No. 2 shift valve 14 that is in the right-hand side position, to No. 20 oil passage L20 which is communicated with the back pressure chamber of the accumulator 21, is connected to No. 3 oil passage L3 via the annular groove 13e of No. 1 shift valve 13 that is in the right-hand side position. Therefore, there will occur a condition in which the back pressure in the accumulator 21 can be controlled by the hydraulic oil pressure control valve 24 via the pressure adjusting valve 23. The pressure increase characteristics of No. 1 hydraulic clutch C1 after the downshifting from the second speed to the first speed can appropriately be controlled without giving rise to in-gear shocks.

The above-described No. 2 bypass passage L2b functions to control the pressure decrease characteristics of the first-speed hydraulic clutch C1 at the time of switching from the "D" position to the "N" position. This action is explained hereinafter.

Explanations have so far been made about the arrangement of the hydraulic oil circuit in the "D" position of the manual valve 12. Similar arrangement in the hydraulic oil circuit as in the "D" position also applies to the "S" position, in which automatic speed changing between the first speed through the fourth speed is effected according to speed change characteristics that are different from those in the "D" position.

In the "2" position of the manual valve 12, No. 1 oil passage L1 is connected to No. 2 oil passage L2 via the annular groove 12a of the manual valve 12 and is also connected, via the annular grooves 12a, a connection passage 12c and an annular groove 12d, to No. 9 oil passage L9. The line pressure is thus inputted to No. 1 shift valve 13 via No. 9 oil passage L9 and also the output hydraulic oil pressure of the pressure adjusting valve 23 is inputted to No. 1 shift valve 13 via No. 3 oil passage L3. To No. 8 oil passage L8 which leads to No. 2 shift valve 14 there are connected No. 9 oil passage L9 in the right-hand side position of No. 1 shift valve 13 via the annular groove 13d of No. 1 shift valve 13, as well as No. 3 oil passage L3 in the left-hand side position thereof. When No. 8 oil passage L8 is connected to No. 7 oil passage L7 via the annular groove 14c of No. 2 shift valve 14 by changing over No. 2 shift valve 14 to the right-hand side position, the hydraulic oil is supplied to the second-speed hydraulic clutch C2 in whichever, i.e., right or left, position No. 1 shift valve 13 may be positioned, thereby establishing the second-speed transmission train G2. By the way, if the manual shift valve 12 is changed over to the "2" position to thereby suddenly downshift to the second speed while running at a high speed, there sometimes occurs overrunning of the engine or large speed change shocks. Therefore, the following procedure is followed. Namely, when speed changing has been made to the "2" position at above a predetermined vehicle speed, No. 2 shift valve 14 is changed over to the left-hand side position to connect No. 8 oil passage L8 to No. 12 oil passage L12 via the annular groove 14d of No. 2 shift valve 14. The hydraulic oil is thus supplied to the third-speed hydraulic clutch C3 via No. 3 shift valve 15 to thereby establish the third-speed transmission train G3. When the vehicle speed has once been reduced below a predetermined speed, No. 2 shift valve 14 is switched to the right-hand side position to thereby downshift to the second speed. No. 3 shift valve 15 is provided with a left end oil chamber 15i to which is connected No. 25 oil passage L25 which extends from the servo control valve 25. No. 9 oil passage L9 is connected to No. 25 oil passage L25 via a shuttle valve 33. In the "2" position of the manual valve 12 the line pressure is inputted to the oil chamber 15i from No. 9 oil passage L9 via No. 25 oil passage L25. No. 3 shift valve 15 is restrained to the right-hand third-speed position in which No. 10 oil passage L10 which is communicated with the third-speed hydraulic clutch C3 is connected to No. 12 oil passage L12 via the annular groove 15c of No. 3 shift valve 15. Even if No. 1 solenoid valve $20_1$ is closed, No. 3 shift valve 15 will not be switched to the left-hand fourth-speed position.

In the "L" position of the manual valve 12, No. 1 oil passage L1 is connected to No. 2 oil passage 12 via the annular groove 12a of the manual valve 12 and also connected to No. 26 oil passage L26 which is communicated with a left end oil chamber 14f of No. 2 shift valve 14 via the annular groove 12a, the connecting passage 12c and the annular groove 12d. No. 2 shift valve 14 is thus restrained to the right-hand second-speed position. Further, No. 27 oil passage L27 which extends from No. 1 shift valve 13 is connected to No. 28 oil passage L28 which is communicated, via an annular groove 12e of the manual valve 12, with the first-speed holding clutch CH. When No. 1 shift valve 13 is switched to the right-hand side position, No. 3 oil passage L3 is connected to No. 27 oil passage L27 via the annular groove 13e of No. 1 shift valve 13. The hydraulic oil is thus supplied to the first-speed holding clutch CH, thereby establishing the first-speed transmission train G1 in a condition in which the engine braking can be applied. When a switch is made to the "L" position at above a predetermined vehicle speed, No. 1 shift valve 13 is switched to the left-hand side position to connect No. 3 oil passage L3 to No. 8 oil passage L8. The hydraulic oil is thus supplied to the second-speed hydraulic clutch C2 via No. 2 shift valve 14 that is restrained to the right second-speed position, thereby establishing the second-speed transmission train G2. When the vehicle speed has been decreased below a predetermined speed, No. 1 shift valve 13 is switched to the right-hand side position to thereby downshift to the first speed.

In the "R" position of the manual valve 12, No. 1 oil passage L1 is connected, via the annular groove 12a of the manual valve 12, to No. 29 oil passage L29 which leads to No. 1 sift valve 13. Further, a branch oil passage L11a which is branched, via a shuttle valve 34, from No. 11 oil passage L11 which is communicated with the fourth-speed hydraulic clutch C4 is connected, via the annular groove 12e of the manual valve 12, to No. 30 oil passage L30 which extends from No. 2 shift valve 14. In the "R" position, No. 1 shift valve is switched to the left-hand side position. According to this operation, No. 29 oil passage L29 is connected, via an annular groove 13h of No. 1 shift valve 13, to No. 31 oil passage L31 which is communicated with a left end oil chamber 16a of the servo valve 16. The servo valve 16 is thus moved to the right by the line pressure that is inputted via No. 31 oil passage L31, with the result that the selector gear 6 is switched to the right-hand reverse-running position. In the reverse-running position, No. 31 oil passage L31 is connected, via that annular groove 16b of the servo valve 16 which opens into the oil chamber 16a, to No. 32 oil passage L32 which leads to No. 2 shift valve 14. No. 32 oil passage L32 is connected to No. 30 oil passage L30 via No. 2 shift valve 14, and the hydraulic oil is supplied to the fourth-speed hydraulic clutch C4, via the branch oil passage 11a, thereby establishing the reverse running transmission train GR. By the way, No. 32 oil passage L32 is branched, at its downstream side, into two branch oil passages L32a, L32b. The hydraulic oil pressure in the branch oil passage L32b is made adjustable by the pressure adjusting valve 23. No. 30 oil passage L30 is selectively connected, via an annular groove 14g of No. 2 shift valve 14, to one L32a of the branched oil passages at the left-hand side position thereof 14, and to the other L32b thereof at the right-hand side position thereof 14. It is thus so arranged that the line pressure and the output pressure of the pressure adjusting valve 23 can be selected as the working pressure of the fourth-speed hydraulic clutch C4.

When the manual valve 9 is changed over from the "R" position to the forward-running positions of "D", "S", "2" and "L", the line pressure is inputted to the right-hand oil chamber 16c of the servo valve 16 via No. 18 oil passage L18, the servo control valve 25 and No. 19 oil passage 19. The servo valve 16 is thus moved to the left to switch the selector gear 6 to the left forward-running position. In this case, if the changeover is made from the "R" position to the forward-running position in a condition in which the driving wheels are slipping, the selector gear 6 sometimes moves to the left while the output shaft 1b is running through inertia in the opposite direction, with the result that a smooth changeover of the selector gear 6 to the forward-running position cannot sometimes be made. As a solution, the following arrangement has been made. Namely, the hydraulic oil pressure of the first-speed hydraulic clutch C1 is caused to be applied to the right end oil chamber of the servo control valve 25 via a branched oil passage L2c of No. 2 oil passage L2. When the hydraulic oil pressure in the first-speed hydraulic clutch C1 has increased to a certain degree and, due to the engaging force of the first-speed hydraulic clutch C1, the reverse running of the output shaft 1b has been braked, the servo control valve 25 is moved to the left against a spring 25a. No. 18 oil passage L18 is thus connected to No. 19 oil passage L19, thereby moving the servo valve 16 to the left. The hydraulic oil pressure of No. 31 oil passage L31 is also caused to be applied to the left end of the servo control valve 25 so that, at the time of reverse running, the servo control valve 25 can surely be returned to the right-hand side position. Furthermore, there is provided No. 33 oil passage L33 which is communicated, at the reverse-running position of the servo valve 16, with the right-hand side oil chamber 16c of the servo valve 16 via a notched groove 16d thereof. No. 25 oil passage L25 which is communicated with the left end oil chamber 15i of No. 3 shift valve 15 is arranged to be switched, in the right-hand side position of the servo control valve 25, to No. 18 oil passage L18 and, in the left-hand side position of the servo control valve 25, to No. 33 oil passage L33. According to this arrangement, in case the selector gear 6 is not switched to the forward-running position when a switch has been made from the "R" position to the "D" or "S" position because the servo control valve 25 is restrained to the right-hand side position, or else, even when the servo control valve 25 has been switched to the left-hand side position, because the servo valve 16 is restrained to the reverse-running position, the line pressure is inputted to the left end oil chamber 15i of No. 3 shift valve 15 from No. 18 oil passage L18 or No. 33 oil passage L33 via No. 25 oil passage L25. Therefore, No. 3 shift valve 15 is restrained to the right-hand third-speed position, and it becomes impossible to supply the hydraulic oil to the forth-speed hydraulic clutch C4. The establishment of the reverse running transmission train GR at the "D" or "S" position is thus prevented.

In the "N" position of the manual valve 12, the communication between No. 1 oil passage L1 and the other oil passages is cut off. By the way, when the vehicle is stopped in a condition in which the manual valve 12 is in the "D" position, the driving unit made up of the engine and the transmission is displaced in position while elastically deforming engine mounting elements by the driving reaction forces due to the power transmission via the first-speed transmission train G1. When the manual valve 12 is switched at this time to the "N" position to attain the neutral condition, the displaced driving unit returns to the normal position, giving rise to a problem of shocks (off-gear shocks or shocks at the time of gear disengagement). In the "N" position, No. 2 oil passage L2 is opened to atmosphere via the annular groove 12d of the manual valve 12 and the connection passage 12c, and the hydraulic oil is discharged from the first-speed hydraulic clutch C1. At this time, if the hydraulic oil pressure in the first-speed hydraulic clutch C1 is gradually decreased by restricting the oil discharge by means of the orifice 30 in No. 2 oil passage L2, the above-described off-gear shocks by a rapid releasing of the driving force can be prevented. However, in case the viscosity of the hydraulic oil is high at a low temperature, the releasing of the first-speed hydraulic clutch C1 will become too slow if the oil discharge is restricted by the orifice 30. As a result, it will cause the dragging of the hydraulic clutch C1 and adversely affects the durability of the hydraulic clutch C1. In this case, if No. 1 shift valve 13 is changed over to the left-hand side position, the above-described second bypass passage L2b is opened to communication to discharge the hydraulic oil by bypassing the orifice 30. Therefore, there will occur no such disadvantage as an excessive delay in the disengagement of the first-speed hydraulic clutch C1.

Further, if the disengagement of the first-speed hydraulic clutch C1 is delayed when the engine output is above a predetermined level or when the vehicle speed is above a predetermined value, there will occur a deterioration in the durability of the hydraulic clutch due to the dragging thereof in the same manner as described above. It is therefore preferable to discharge the hydraulic oil by bypassing the orifice 30.

Figure 4:
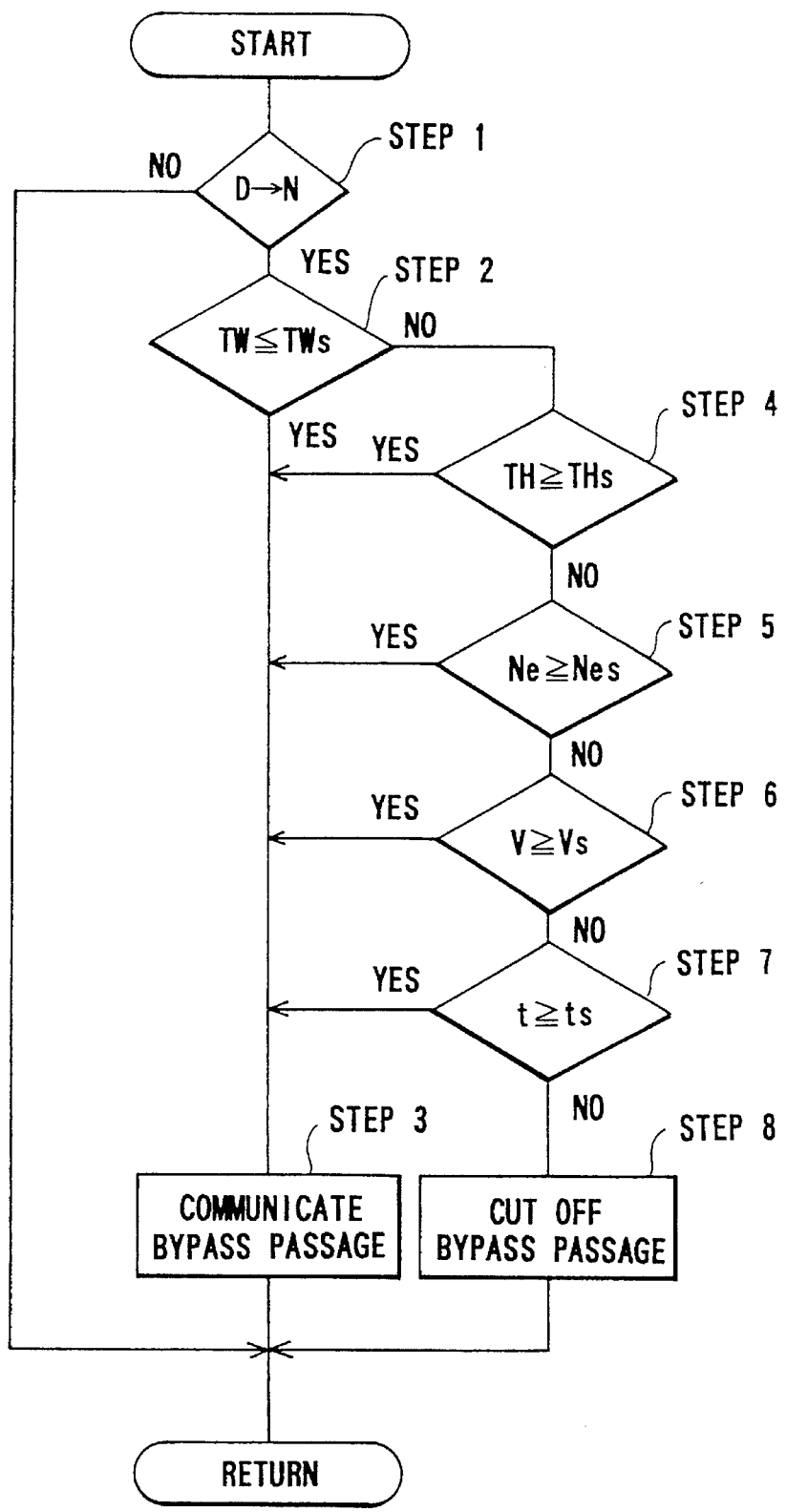
FIG. 4 a flow chart showing the control program at the time of gear disengagement.

FIG. 4 shows a control program at the time of changing over from the "D" position to the "N" position (i.e., at the time of gear disengagement). When a discrimination or distinction of a switch from the "D" position to the "N" position has been made at step 1, the program proceeds to step 2, where a discrimination is made as to whether the cooling water temperature TW of the engine is equal to or below a predetermined value TWs. When TW≦TWs, the transmission is in a cold condition and the hydraulic oil is consequently high in viscosity. In such a case, the program proceeds to step 3, where No. 1 shift valve 13 is switched to the left-hand side position to thereby bring No. 2 bypass passage L2b into communication. At this time, the hydraulic oil is discharged from the first-speed hydraulic clutch C1 by bypassing the orifice 30. However, since the viscosity of the hydraulic oil is high, the hydraulic oil pressure in the first-speed hydraulic clutch C1 decreases gradually, with the result that off-gear shocks will not occur. By the way, the program may proceed to step 3 when, by detecting the temperature of intake air to the engine or the temperature of the oil in the transmission, the detected temperature is equal to or below a predetermined value, based on a judgement that the transmission is in the cold condition.

When TW>TWs, a discrimination is made at step. 4 as to whether the throttle opening degree TH is equal to or above a predetermined value THs, and also a discrimination is made at step 5 as to whether the revolution speed Ne of the engine is equal to or above a predetermined value Nes. Further, at step 6, a discrimination is made as to whether the vehicle speed V is equal to or above a predetermined value Vs. When TH≧THs or Ne≧Nes, i.e., when the engine output is above a predetermined value, or when V≧ Vs, the program proceeds to step 3 to thereby bring No. 2 bypass passage L2b into communication in the same manner as above. The first-speed hydraulic clutch C1 is thus quickly disengaged to prevent the dragging thereof.

When the following four conditions are met, i.e., TW>TWs, TH<THs, Ne<Nes and V<Vs, a discrimination is made at step 7 as to whether an elapsed time t from the point of time of gear disengagement has reached a predetermined time ts. While t<ts, the program proceeds to step 8, where No. 1 shift valve 13 is switched to the right-hand side position to cut off the communication of No. 2 bypass passage L2b. According to this arrangement, the oil discharge from the first-speed hydraulic clutch C1 is restricted by the orifice 30 and, therefore, the severity of the off-gear shocks are is reduced. The time ts is set to a time which is necessary and sufficient to alleviate the severity of the off-gear shocks and, when a condition of t=ts has been met, the program proceeds to step 3 to thereby bring No. 2 bypass passage L2b into communication. In this manner, after having alleviated the severity of the off-gear shocks, the first-speed hydraulic clutch C1 is rapidly disengaged and, consequently, the dragging of the clutch C1 is prevented.

By the way, an exclusive control valve which brings No. 2 bypass passage L2b into, and out of, communication may be provided. However, if an arrangement is made such as in the embodying example of the present invention such that No. 2 bypass passage L2b is brought into, and out of, communication by No. 1 shift valve 13, it is advantageous because no separate control valve is required.

In the "N" position, the electric power supply to the solenoid valves is normally turned off to save the electric power consumption. In such a case, No. 1 shift valve 13 may be switched to the left-hand side position by the closing operation of the normally-closed type No. 1 and No. 2 solenoid valves $20_1$, $20_2$. When the severity of the off-gear shocks become troublesome, however, No. 1 shift valve 13 is held to the right-hand side position for a predetermined period of time from the time of switching from the "D" position to the "N" position to shut off the second bypass passage L2b of No. 2 oil passage L2, thereby restricting the oil discharge through the orifice 30.

In the "P" position of the manual valve 12, No. 1 oil passage L1 is connected, like in the "R" position, to No. 29 oil passage L29 and changes over the servo valve 16 to the reverse-running position by the inputting of the line pressure thereto via No. 31 oil passage L31. However, since No. 30 oil passage L30 is not connected to the bypass passage L11a in the "P" position, the reverse transmission train GR is not established.

As can be seen from the above description, according to the present invention, the severity of off-gear shocks can be reduced by adequately controlling the pressure decrease characteristics of the hydraulic engaging element for the low-speed transmission train, and the deterioration of the durability of the hydraulic engaging elements due to dragging can be prevented.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of hydraulic engaging elements, said control apparatus comprising:

flow restricting means disposed in an oil passage which communicates with a hydraulic engaging element for a low-speed transmission train;

a bypass passage which bypasses said flow restricting means;

a control valve switchable between a communicated state in which said bypass passage is in communication and a cut-off state in which the communication of said bypass passage is cut off; and control means for switching said control valve to the cut-off state at an initial stage of changing over from a running range to a neutral range and then switching said control valve to the communicated state at a succeeding predetermined state, wherein said control means is arranged such that said control valve is switched to the communicated state from the initial stage of switching to the neutral range, under a predetermined operating condition.

2. A control apparatus according to claim 1, wherein the predetermined operating condition is one in which said transmission is in a cold state.

3. A control apparatus according to claim 2, wherein the cold state is determined based on detection that at least any one of a temperature of cooling liquid for an engine, a temperature of intake air to the engine, and a temperature of oil in said transmission is below a predetermined value.

4. A control apparatus according to claim 1, wherein said predetermined operating condition is one in which an engine output torque is above a predetermined value.

5. A control apparatus according to claim 4, wherein determination that the engine output is above the predetermined value is based on detection that at least either a revolution speed of the engine or a throttle opening degree is above a predetermined value.

6. A control apparatus according to claim 1, wherein the predetermined operating condition is one in which a vehicle speed is above a predetermined value.

7. A control apparatus according to claim 1, wherein the predetermined period is determined by a time elapsed from the time of switching from the running range to the neutral range.

8. A control apparatus according to claim 7, wherein said control valve is constituted by a shift valve which effects establishment and release of the low-speed transmission train.

9. A control apparatus according to claim anyone of claims 1–6, wherein said control valve is constituted by a shift valve which effects establishment and release of the low-speed transmission train.

* * * * *